US009341726B2

(12) United States Patent
Kostov et al.

(10) Patent No.: US 9,341,726 B2
(45) Date of Patent: May 17, 2016

(54) PROCESSING SEISMIC DATA

(75) Inventors: Clement Kostov, Montigny-le-Bretonneux (FR); Jon-Fredrik Hopperstad, Cambridge (GB); Philip Kitchenside, Orpington (GB); Johan Olof Anders Robertsson, Grantchester (GB); Karin Schalkwijk, Royston (GB)

(73) Assignee: WESTERNGECO L.L.C., Houston, TX (US)

( * ) Notice: Subject to any disclaimer, the term of this patent is extended or adjusted under 35 U.S.C. 154(b) by 1098 days.

(21) Appl. No.: 13/259,639

(22) PCT Filed: Feb. 24, 2010

(86) PCT No.: PCT/IB2010/000375
§ 371 (c)(1),
(2), (4) Date: Jan. 4, 2012

(87) PCT Pub. No.: WO2010/109281
PCT Pub. Date: Sep. 30, 2010

(65) Prior Publication Data
US 2012/0095689 A1  Apr. 19, 2012

(30) Foreign Application Priority Data

Mar. 27, 2009 (GB) .................................. 0905261.4
Jun. 30, 2009 (GB) .................................. 0911299.6

(51) Int. Cl.
*G01V 1/00* (2006.01)
*G01V 1/28* (2006.01)
(Continued)

(52) U.S. Cl.
CPC ... *G01V 1/28* (2013.01); *G01V 1/34* (2013.01); *G01V 1/364* (2013.01); *G01V 99/005* (2013.01); *G01V 2210/644* (2013.01); *G01V 2210/66* (2013.01)

(58) Field of Classification Search
CPC ..... G01V 99/005; G01V 1/34; G01V 1/3808; G01V 1/3817; G01V 1/3835; G01V 3/38; G01V 1/003

USPC .......................................................... 702/14
See application file for complete search history.

(56) References Cited

U.S. PATENT DOCUMENTS 4,357,689 A * 11/1982 Ruehle ........................... 367/23
4,476,553 A   10/1984 Ziolkowski et al.
(Continued)

FOREIGN PATENT DOCUMENTS

GB  2328017 A   2/1999
GB  2425838 A  11/2006
(Continued)

OTHER PUBLICATIONS

Amundsen et al: "Multidimensional signature deconvolution and free-surface multiple elimination of marine multicomponent ocean-bottom seismic data", Geophysics, vol. 66, No. 5, 2001, pp. 1594-1604.
(Continued)

*Primary Examiner* — John Breene
*Assistant Examiner* — Eyob Hagos

(57) ABSTRACT

A method of processing seismic data acquired consequent to actuation of a seismic source is described. The method comprises taking the result of the following process into account when processing the seismic data where the process comprises estimating the effect of uncertainty in the position and/or orientation of the seismic source relative to the measuring receiver on processing the seismic data by estimating a source wavefield from data acquired by a near-field measuring receiver and from a first parameter set including at least one parameter indicative of the position and/or orientation of the seismic source relative to the measuring receiver, varying the value of at least one parameter of the first parameter set, estimating the source wavefield from the data acquired by the measuring receiver and from the varied first parameter set and obtaining information about the uncertainty in the estimate of the source wavefield.

14 Claims, 4 Drawing Sheets

(51) Int. Cl.
*G01V 99/00* (2009.01)
*G01V 1/34* (2006.01)
*G01V 1/36* (2006.01)

(56) References Cited

U.S. PATENT DOCUMENTS

| | | | |
|---|---|---|---|
| 4,908,801 A | | 3/1990 | Bell et al. |
| 4,988,885 A | * | 1/1991 | Lindstrom ............... 250/559.22 |
| 5,247,486 A | | 9/1993 | Regnault |
| 5,384,752 A | | 1/1995 | Duren et al. |
| 6,236,943 B1 | * | 5/2001 | Aminzadeh et al. ............ 702/16 |
| 6,529,445 B1 | | 3/2003 | Laws |
| 6,549,854 B1 | * | 4/2003 | Malinverno et al. ............ 702/16 |
| 6,788,618 B2 | | 9/2004 | Clayton et al. |
| 6,901,028 B2 | | 5/2005 | Clayton et al. |
| 2003/0193837 A1 | * | 10/2003 | Rommel .......................... 367/37 |
| 2004/0215396 A1 | * | 10/2004 | Christie et al. .................. 702/14 |
| 2005/0259513 A1 | * | 11/2005 | Parkes ............................ 367/23 |
| 2006/0193204 A1 | | 8/2006 | Davies et al. |
| 2007/0032954 A1 | | 2/2007 | Moore et al. |
| 2007/0223307 A1 | * | 9/2007 | Storteig et al. .................. 367/16 |
| 2008/0015783 A1 | | 1/2008 | Robertsson et al. |
| 2008/0019215 A1 | * | 1/2008 | Robertsson et al. ............ 367/19 |
| 2010/0002539 A1 | * | 1/2010 | Kragh et al. .................... 367/23 |
| 2012/0087207 A1 | | 4/2012 | Kostov et al. |

FOREIGN PATENT DOCUMENTS

| | | |
|---|---|---|
| GB | 2433594 B | 8/2008 |
| GB | 2468912 B | 11/2011 |
| GB | 2479299 B | 11/2011 |
| WO | 03079049 A2 | 9/2003 |
| WO | 2010109280 A2 | 9/2010 |
| WO | 2010109280 A3 | 1/2011 |

OTHER PUBLICATIONS

Amundsen et al: "Attenuation of free-surface multiples from marine pressure and pressure gradient", EAGE 65th Conference and Exhibition, Stavanger, Norway, Jun. 2-5, 2003, p. 192.

Dragoset et al: "Some remarks on surface multiple attenuation", Geophysics, vol. 63, No. 2, 1998, pp. 772-789.

Johnston et al: "Benefits of source signature measurements for multiple removal in streamer and OBC data", 1999 SEG Annual Meeting, Oct. 31-Nov. 5, 1999, Houston, Texas, Expanded Abstracts.

Majdanski et al: "Field data results of elimination of free-surface-related events for marine over/under streamer data", 72nd EAGE Conference and Exhibition incorporating SPE EUOROPEC 2010, Barcelona, Spain, Jun. 14-17, 2010, B017.

Muijs et al: "Prestack depth migration of primary and surface-related multiple reflections", SEG 75th International Annual Meeting, Houston, Texas, Nov. 6-11, 2005, Expanded Abstracts, pp. 2107-2110.

Stefani et al: "Acquisition using simultaneous sources", EAGE 69th Conference and Exhibition, London, United Kingdom, Jun. 11-14, 2007, B006.

Ziolkowski et al: "The signature of an air gun array: Computation from near-field measurements including interactions", Geophysics, vol. 47, No. 10, 1982, pp. 1413-1421.

Combined Search and Examination Report of British Application No. GB 0905260.6 dated Jul. 29, 2009.

Combined Search and Examination Report of British Application No. GB 1111910.4 dated Jul. 29, 2011.

International Search Report of PCT Application No. PCT/IB2010/000343 dated Oct. 25, 2010.

Combined Search and Examination Report of British Application No. GB 0911299.6 dated Oct. 26, 2009.

International Search Report of PCT Application No. PCT/IB2010/000375 dated Aug. 13, 2010.

* cited by examiner

PROCESSING SEISMIC DATA

BACKGROUND OF THE DISCLOSURE

The present invention relates to seismic surveying. In particular, it relates to a method of and system for seismic surveying which makes use of information about uncertainty in the signature of a seismic source.

The principle of seismic surveying is that a source of seismic energy is caused to emit seismic energy such that it propagates downwardly through the earth. The downwardly-propagating seismic energy is reflected by one or more geological structures within the earth that act as partial reflectors of seismic energy. The reflected seismic energy is detected by one or more sensors (generally referred to as "receivers"). It is possible to obtain information about the geological structure of the earth from seismic energy that undergoes reflection within the earth and is subsequently acquired at the receivers.

When a seismic source array is actuated to emit seismic energy it emits seismic energy over a defined period of time. The emitted seismic energy from a seismic source array is not at a single (temporal) frequency but contains components over a range of frequencies. The amplitude of the emitted seismic energy is not constant over the emitted frequency range, but is frequency dependent. The emitted seismic energy from a seismic source array may also vary in space due to two factors: the source array may emit different amounts of energy in different directions, and the seismic wavefronts may "expand" with time (expanding spherical waves as opposed to plane waves). The seismic wavefield emitted by a seismic source array is known as the "signature" of the source array. When seismic data are processed, knowledge of the signature of the seismic source array used is desirable, since this allows more accurate identification of events in the seismic data that arise from geological structures within the earth. In simple mathematical terms, the seismic wavefield acquired at a receiver is the convolution operation of two factors; one representative of the earth's structure, and another representative of the wavefield emitted by the source array. The more accurate is the knowledge of the source array's signature, the more accurately the earth model may be recovered from the acquired seismic data.

A manufacturer of a seismic source may provide a general source signature for the seismic source. However, each time that a seismic source is actuated the actual emitted wavefield may vary slightly from the theoretical source signature. In a typical seismic survey a seismic source array is actuated repeatedly and seismic data are acquired consequent to each actuation of the source array. Each actuation of the source array is known as a "shot". In processing seismic data it is desirable to know as accurately as possible the source signature for each shot.

It has been suggested that one or more seismic receivers may be positioned close to a seismic source, in order to record the source signature. By positioning the seismic receiver(s) close to the seismic source the wavefield acquired by the seismic receiver(s) should be a reliable measurement of the emitted source wavefield. WesternGeco's Trisor/CMS system provides estimates of the source wavefield from measurements with near-field hydrophones near each of the seismic sources composing the source arrays in marine seismic surveys. These estimates have been used to control the quality and repeatability of the emitted signals, and to perform compensation for shot-to-shot variations or source-array directivity. Recent comparison of signals, predicted by the Trisor/CMS system or recorded with point-receiver hydrophones (Q-marine system), indicate that the quality of the Trisor/CMS estimates is excellent over a large band of frequencies and source take-off angles.

FIG. 1 shows a comparison between a Trisor/CMS predicted incident wavefield (a) and an incident wavefield measured with a near-offset hydrophone on a Q-marine streamer, towed 23 m deep (b). The waveforms have been bandlimited to a range of frequencies between 1 and 120 Hz. It can be seen that the agreement between the two waveforms is very good over this range of frequencies. Note that the energy is propagating to the near-offset hydrophone following a nearly horizontal raypath corresponding to a take-off angle of 80 degrees.

The Trisor/CMS incident wavefield is the result of a computation involving several measurements or estimated quantities and some assumptions, as described for instance in Ziolkowski, A. et al., "The signature of an air gun array: Computation from near-field measurements including interactions", Geophysics, 47, No. 10, p. 1413-1421 (1982).

The key factors influencing the estimation are the position data for the guns and near-field hydrophones, as well as the estimate of the free surface reflection coefficient.

BRIEF SUMMARY OF THE DISCLOSURE

A first aspect of the present invention provides a method of processing seismic data acquired consequent to actuation of a seismic source array, the method comprising the steps of:
(a) estimating the source wavefield and the uncertainty in the source wavefield by:
  (i) estimating a source wavefield from measurements acquired by a near-field measuring receiver and from a first parameter set including at least one parameter indicative of the position and/or orientation of the seismic source array relative to the measuring receiver;
  (ii) varying the value of at least one parameter of the first parameter set,
  (iii) estimating the source wavefield from the measurements acquired by the measuring receiver and from the varied first parameter set; and
  (iv) obtaining information about the uncertainty in the estimate of the source wavefield from the results of step (i) and (iii); and
(b) taking the result of step (a) into account when processing the seismic data.

This procedure makes possible more accurate processing of acquired seismic data, by providing information as to how the uncertainties in, for example, the position of the seismic source relative to the measuring receiver and/or the orientation of the seismic source affect the processed seismic data. The processing may then be carried out, for example, by selecting a subset of the data for which the uncertainties are known to be low.

Once information about the uncertainty in the estimate of the source array wavefield has been obtained from the first parameter set, the information about the uncertainty may be refined by repeating the process with one or more different parameters sets. For example, the first parameter set may include parameters such as the central position, and/or skew and tilt angles of at least one (and preferably each) sub-array of two or more sources, thereby providing information about uncertainties assuming nominal source positions within each sub-array. The process may then be repeated for, for example, with an expanded parameter set including the relative positions of the sources within each sub-array. Other parameters that may be used include: the relative positions of the near-field measuring receiver and the sources of the source array (for example derived from GPS sensors and/or depth sensors) and, in the case of marine seismic surveying, the sea surface state and/or the mean wave height.

Step (b) may comprise electing, for processing, a subset of the seismic data in which the expected uncertainty is low. This should reduce the effect on the processed data of uncertainty in the estimate of the source wavefield.

Step (b) may comprise determining a frequency range in which the effect of uncertainty is low, or determining a range of take-off angles in which the effect of uncertainty is low, and selecting seismic data within the determined frequency range or range of take-off angles for processing.

Step (b) may alternatively comprise processing the seismic data and selecting a subset of the processed seismic data in which the expected uncertainty is low. The selected subset may again be a frequency range or a range of take-off angles for which the uncertainty in the estimate of the source wavefield is low.

The method may comprise processing the seismic data to obtain information about at least one parameter of the earth's interior.

Processing the seismic data to obtain information about the at least one parameter of the earth's interior may be effected by processing a subset of the seismic data in which the expected uncertainty in the estimate of the source wavefield is low (so that seismic data for which the expected uncertainty in the estimate of the source wavefield is high are omitted from processing). Alternatively all acquired seismic data may be processed, with a subset of the seismic data in which the expected uncertainty in the estimate of the source wavefield is low being selected subsequently for further analysis.

Processing the seismic data to obtain information about at least one parameter of the earth's interior may for example comprise one or more of the following techniques:

Wavefield separation;
Removal of free-surface effects;
Removal of multiples;
Imaging with primaries and multiples;
Imaging with primaries and source-side ghost;
AVO and full-waveform inversion;
Source deconvolution;
Processing of data acquired using simultaneous sources.

Other aspects of the invention provide a corresponding apparatus and computer-readable medium. Preferred features of the invention are set out in the dependent claims.

Most seismic source arrays used in practice contain a plurality of seismic sources, for example arranged in two or more sub-arrays. The invention will be described with reference to a seismic source array containing a plurality of sources although, in principle, the invention may be applied to a source array consisting of a single seismic source.

BRIEF DESCRIPTION OF THE DRAWINGS

Embodiments of the present invention will be described by way of illustrative example with reference to the accompanying figures in which.

Figure 1:
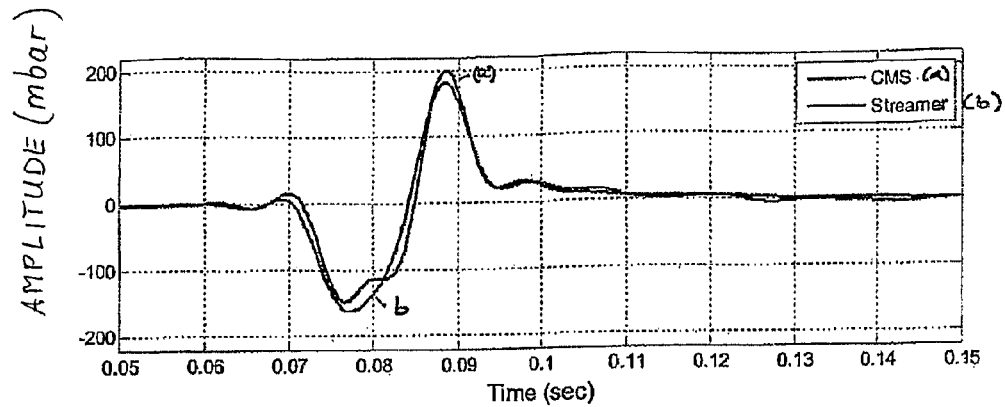
FIG. 1 is shows a comparison between a predicted incident wavefield and a measured incident wavefield.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As explained above, it is known to obtain an estimate of the source signature of a seismic source array by disposing a seismic receiver near each seismic source (e.g. each airgun in a source array) to measure one or more characteristics of the near-field wavefield. In the case of a marine seismic survey, for example, one or more hydrophones may be placed near each seismic source to measure the near-field wavefield, typically at a distance of the order of one meter from the seismic source. These near-field hydrophone(s) measure the pressure resulting from the combined emissions of all sources in the source array. The wavefield emitted by the source array may be estimated from the measured pressure at all the near-field hydrophone(s) in a "black box" process comprised of one assumption and two main processing steps. The assumption is that each source element in the array emits a wavefield whose mathematical expression is known except for a signature (notional signature) describing the time variation of the source signal. The first processing step provides the "notional signatures" by removing the effects of interactions between sources, while the second step computes the emitted wavefield as a superposition of the wavefields emitted from point sources with notional signatures.

It is however the case that the data input to the "black box" is subject to uncertainty. For example, the locations of the sources and the location(s) of the near-field hydrophone(s) are usually determined by means of position sensors, for example GPS sensors and/or depth sensors, located on the source and the near-field hydrophone. The positions obtained by the position sensors are inevitably subject to some uncertainty. Similarly, the pressure values measured by the near-field hydrophone are also subject to some uncertainty. Moreover, uncertainties in the measurements of source array elements and of hydrophones may be very different, because of the different methods used to measure those positions (e.g. a network of acoustic sensors may be used to determine hydrophone positions).

In addition, in general the emitted wavefield from a seismic source array is not isotropic, so that knowledge of, or an estimate of, the positions of the sources in the array would preferably also be used in the estimation of the emitted wavefield. Uncertainty in the positions of the seismic sources in the array leads to uncertainty in the recovered earth model.

Furthermore, other parameters may be required to obtain a reliable estimate of the emitted wavefield. For example, in the case of a marine seismic survey, the seismic source array is generally towed a few meters below the surface of the water (this will be referred to as the "sea-surface" for convenience, but use of "sea-surface" is not intended to exclude a survey in fresh or brackish water). The wavefield at points below the level of the source will contain one component that has travelled direct from the source and another component that was emitted upwards by the source and that has been reflected downwards by the sea-surface. The component of the wavefield arising from reflection at the sea-surface will depend on the state of the sea-surface, and an estimate of the sea-surface, for example the mean wave height, is therefore preferably used in the estimation of the emitted wavefield from a marine seismic source.

As a further example, seismic sources in an array may be arranged in two or more sub-arrays, with each sub-array having a specified position and orientation relative to the other sub-arrays—for example the sub-arrays may be specified as extending parallel to and spaced from one another. If the actual positions or orientations of the source array deviate from the specified positions or orientations, this may cause errors in the estimation of the emitted wavefield from the array.

Figure 2:
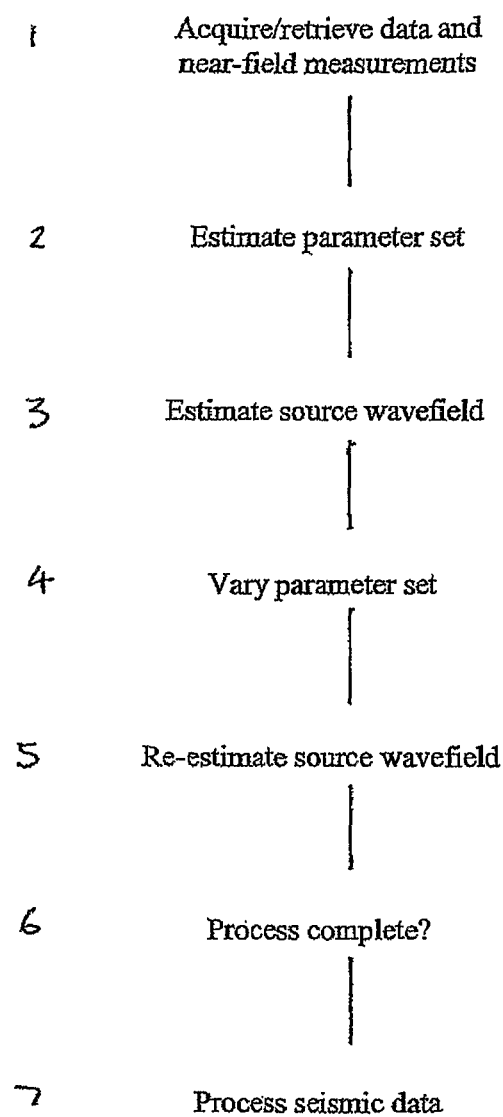
FIG. 2 is a block flow diagram of a method in accordance with an embodiment of the present invention.

FIG. 2 is a block flow diagram illustrating a method in accordance with an embodiment of the present invention. Initially at step 1 seismic data are obtained. A seismic source array containing one or more seismic sources is actuated, and seismic data are acquired by an array of one or more seismic receivers in known fashion. During step 1, near field measurements of at least one characteristic of the source wavefield (for example the pressure) are also obtained, by one or more near field measuring receivers located near to the sources of the source array. For example, the near-field measuring receivers may be hydrophones, with each hydrophone being mounted near a respective source of the array (for example at a distance of approximately 1 m from its respective source).

The invention may also be carried out on pre-existing seismic data, in which step 1 alternatively comprises, retrieving seismic data and the near-field measurements from storage.

At step 2, a set of parameters for determining an estimate of the source wavefield is chosen. The set of parameters will include at least one measurement of a characteristic of the source wavefield made by the measuring receiver (for example a pressure measurement made by a near-field hydrophone). The set of parameters will also include at least one parameter relating to the relative position and/or orientation of the seismic sources relative to the measuring receiver. For example the parameters may include a measurement of the position of the source and a measurement of the position of the near-field hydrophone). The set of parameters may additionally or alternatively include other parameters relating to, for example, the orientation of the seismic source array (for example the tilt and/or skew angles characterizing the positions of groups of sources within the array), the state of the sea-surface in the case of marine seismic data (for example the mean wave height), etc.

At step 3, the source wavefield is estimated for the set of parameters chosen in step 1. The result of step 3 may be, for example, an estimate of the power spectrum of the emitted wavefield, which shows the power as a function of frequency at some specified location in space. (The power spectrum of a function is defined as the Fourier transform of the autocorrelation of the function.)

At step 4, the set of parameters is modified. The set of parameters may be modified in step 4 by, for example, varying the value of one of the parameters initially chosen in step 3, while keeping all other parameters constant. Step 3 is then repeated for the modified set of parameters.

Steps 3 and 4 are repeated until a determination is made at step 5 that the source wavefield has been estimated for a sufficient number of sets of parameters.

Steps 3 and 4 may consist of a performing a "Monte Carlo" simulation of the source wavefield. In essence, in a Monte Carlo simulation a calculation is performed a number of times, with the values of one or more of the parameters input to the calculation being varied randomly or semi-randomly between each calculation.

Figures 3A, 3B:
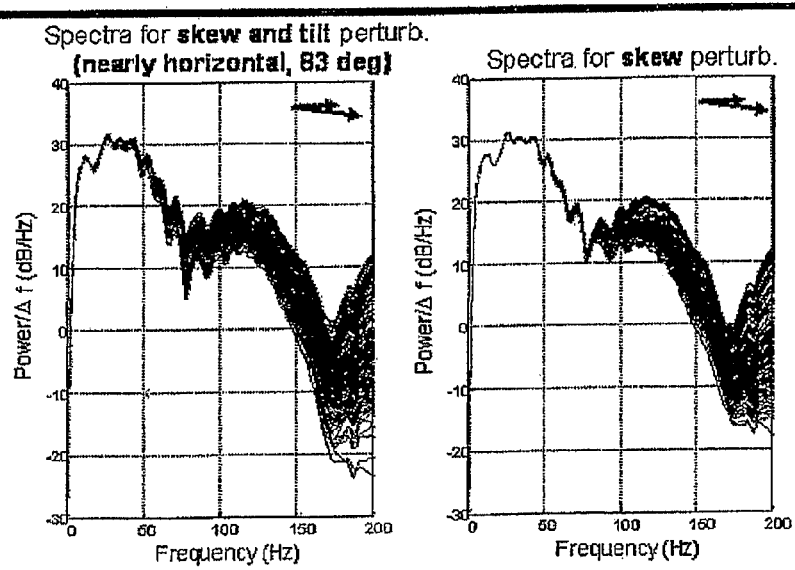
FIGS. 3(*a*) and 3(*b*) illustrate results obtained by an embodiment of the present invention.

Typical results are shown in FIGS. 3(a) and 3(b). The show estimated power spectra of a marine seismic source, as estimated for different values of skew and tilt of the sub-arrays (FIG. 3(a)) and as estimated for different values of skew of the sub-arrays (FIG. 3(b)). That is, in the example of FIG. 3(a), step 4 comprises varying the value of tilt and/or skew of the sub-arrays—other parameters, such as the positions of the source and the measuring receiver, were not varied.

The skew and tilt angles are used to define the position of a sub-array of seismic sources, and more precisely, the position of the rigid beam to which the seismic sources are attached. The position of the beam is fully determined by the three coordinates (x,y,z) of its centre, and by two angles, one angle in the (x,z) plane for the skew, and the other angle in the (x,y) plane for the tilt, where x is inline (along the direction of boat motion), z is depth, and y is crossline (perpendicular to direction of boat motion). They may be estimate from, for example, GPS or other position measurements of the ends of the sub-array. (This is strictly appropriate only for linear sub-arrays—if the rigid frame supporting the seismic sources were not a linear beam a different set of parameters would be required to define the position of the frame.)

At step 6, a determination about the range of data that can reliably be used is made. In the example of FIG. 3(b), it can be seen that the variations in the skew have little effect on the estimated power spectrum of the source wavefield for frequencies below about 70 Hz, but have significant effect on the power spectrum for frequencies below about 70 Hz. Similarly, in the example of FIG. 3(a), it can be seen that the variations in tilt and skew have little effect on the estimated power spectrum of the source wavefield for frequencies below about 50 Hz, but have significant effect on the power spectrum of the source wavefield for frequencies above about 50 Hz. Thus, this shows that the source wavefield may be reliably estimated for frequencies of below approximately 50 Hz, and possibly for frequencies of up to approximately 70 Hz, but that the estimate becomes unreliable at higher frequencies. This in turns means that the earth model can be recovered with low uncertainty for frequencies of up to approximately 50 Hz or up to approximately 70 Hz, but that the uncertainty in the recovered earth model will be higher at higher frequencies. Thus, the results of FIGS. 3(a) and 3(b) may be used to provide information about the uncertainty in the estimate of the source wavefield and, in particular, to determine for which conditions the estimate has small uncertainty and for which conditions the estimate has large uncertainty.

The process may be repeated by varying the value of one or more other parameters. For example, the process may be repeated to determine how uncertainty in the relative positions between sources in the array affects the estimate of the source, wavefield, by varying the value of the positions of the sources. This may be used to further refine, at each position of interest in the far field, the frequency range over which the source wavefield may be reliably estimated.

At step 7 the seismic data acquired in step 1 are processed to obtain information about the geological structure of the earth, for example to determine a parameter of the earth's interior, to locate or characterise a petroleum deposit, etc. According to the present invention, the results of step 6 are taken into account at step 7. For example, the results of step 6 may be used to select a subset of the acquired seismic data, and the processing step 7 may be performed only on the subset of the acquired seismic data selected in step 6. Alternatively, the processing step 7 may be performed on the acquired seismic data, and the results of step 6 may then be used to select a subset of the results of step 7.

As an example, if there was uncertainty in the skew and tilt angles of the seismic source array at the time of data acquisition of step 1, the results of FIG. 2(a) indicate that the source wavefield may be estimated with reasonable accuracy for frequencies below approximately 50 Hz, but that significant errors can arise in the estimate of the source wavefield for frequencies above 50 Hz and particularly for frequencies above approximately 70 Hz. In step 7, therefore, the subsequent processing of the acquired seismic data may be restricted to frequencies below 70 Hz or even below 50 Hz, with data at higher frequencies being discarded. Alternatively, step 7 may be carried out on the entire seismic data acquired in step 1, but the results for frequencies above 50 Hz or 70 Hz may be ignored.

In the example above, a frequency range is determined in which the estimate of the source wavefield has low uncertainty. The invention is not however limited to this. For example, the invention may additionally or alternatively be used to determine a range of take-off angles or take-off directions for which the estimate of the source wavefield has low uncertainty, and subsequent processing of the seismic data may be limited to this range of take-off angles/take-off directions (the "take-off" angle is the angle that emitted seismic energy makes to the downwards direction, so a take-off angle of 0° correspond to energy that is emitted vertically downwards and a take-off angle of 90° correspond to energy that is emitted horizontally; a "take-off direction" is a direction defined by a take-off angle and an angle in the x-y plane (for example the angle between the projection onto the x-y plane of the direction and a given axis).

It should be noted that, while there may be uncertainties in the parameters used for estimating the source wavefield, there may also be constraints on the parameters. For example, if the near-field measuring receiver is attached to the seismic source in some way, the magnitude of the distance between the measuring receiver and the seismic source is, depending on the attachment method, either constrained to be a fixed value or is constrained to be less than a maximum value. This constraint may be applied when the set of parameters is chosen in step 2, or when a new set is chosen in step 4.

Moreover, it may be possible to place limits on the uncertainty associated with the parameters used for estimating the source wavefield. For example, the position sensor used for measuring the position of the seismic source may be quoted as being able to measure the x-, y- and z-co-ordinates with an accuracy of ±Xm. Such a limit may be taken into account when the set of parameters is chosen in step 2, or when a new set is chosen in step 4.

In the above example, the source wavefield is estimate from the measurements made by the near-field sensors (eg hydrophones). However, seismic data acquired in a seismic survey may also be used in the estimation of the source wavefield. In a modified embodiment of the invention, therefore, data acquired at one or more far-field receivers, and information about the location of the far-field receiver(s) relative to the source array are also used in the estimation of the source wavefield at step 3 of FIG. 2.

The invention may also be used to compare an estimate of source wavefield derived from near-field measurements with a measured source wavefield, for example as measured by the direct arrival at receivers on a seismic streamer (in the case of a marine seismic survey). The difference between the measured wavefield and the estimated wavefield may be monitored as, for example, the source array position or orientation is changed.

The measured source wavefield is only available at discrete locations corresponding to the receiver positions. In a typical seismic survey the locations of the receivers means that measurements are only available at high angles of incidence rather than at normal incidence, owing to the lateral separation of the receivers from the source array. However, obtaining agreement between a calculated wavefield and the actual wavefield is most difficult at high angles of incidence so that, if good agreement is found at high incidence angles where measurements are available, this provide a good indication that there will also be good agreement at lower angles of incidence.

It should be noted that, where data acquired at far-field receivers are used, it is preferable that the far-field receivers are single sensor receivers, so that the data acquired at each individual far-field receiver are available. In a conventional streamer receivers are hard-wired into groups, and so provide an output only after group forming. It would be considerably harder to use data representing the output of a group of receivers in the present invention than to use single sensor data.

Other applications of the invention include the following:

1. Wavefield Separation

First, the incident wavefield is separated from the recorded data. The estimated source wavefield is subtracted from the data, leaving the scattered wavefield as required by several processes, e.g. separation of wavefields into downgoing/upgoing components, multiple attenuation, imaging. The present invention may be used to provide an estimate of the source wavefield. The present invention may be applied to identify a subset of data for which the uncertainty in the estimate of the source wavefield is expected to be low, thereby allowing processing to be limited to this subset (for example, limiting the processing to a frequency range for which the uncertainty in the estimate of the source wavefield has been found to be low). The benefit of this approach will be mainly for towed streamer surveys in shallow to moderate water depths where the removal of the incident wavefield is the most problematic. The range of depths where this process is needed should be larger for data acquired with non-conventional source arrays, designed to have more isotropic radiation pattern (as with WesternGeco's AISA array) and to remove the source-side ghost.

In the case of sea-bed surveys, the estimates of the source wavefield provided by the invention may be a better estimate of the incident downgoing wavefield than current estimates, because they won't be affected by interference from the reflection at the sea bed, or by coupling issues.

The estimate of the source wavefield may be used also for calibration of the velocity sensor, prior to separation of upgoing and downgoing wavefields, as described for instance in Johnston and Ziolkowski, "Benefits of source signature measurements for multiple removal in streamer and OBC data", SEG, Expanded Abstracts, vol. 18, issue 1, pages 1346-1349, 1999. This calibration procedure may be combined with the analysis of uncertainties described in this invention, such that only source wavefield estimates with low uncertainties are used in the calibration procedure.

Removal of Free-Surface Effects

The MAUDD algorithm for removal of free-surface effects (Amundsen, L., L. Ikelle, and L. Berg [2001] *Multidimensional Signature Deconvolution And Free-Surface Multiple Elimination Of Marine Multicomponent Ocean-Bottom Seismic Data*: Geophysics, 66, 1594-1604) requires a well sampled total (incident plus scattered) wavefield. It is possible to use the estimates provided by the invention for the extrapolation of the incident wavefield, while using a different interpolation method for the scattered wavefield. Having a separate estimate of the incident wavefield allows us to consider acquisition configurations where the source is not necessarily placed above the receiver array. The present invention may also be used to define a subset of data for which the uncertainty in the estimate of the source wavefield is expected to be low, so that subsequent processing may be limited to this subset.

3. Removal of Multiples

Most algorithms for removal of free-surface multiples are formulated for the scattered wavefield, requiring the removal of the incident wavefield as discussed above. An accurate estimate of the incident wavefield could improve the quality of the predicted multiples for most multiple attenuation methods, but would have a particularly significant impact on the non-iterative method of Dragoset and Jericevic (Dragoset, W., and Z. Jeričević [1998] *Some Remarks On Surface Multiple Attenuation*: Geophysics, 63, 772-789) which requires an estimate of the source wavefield before the computationally intensive steps. The present invention may also be used to define a subset of data for which the uncertainty in the estimate of the source wavefield is expected to be low, so that subsequent processing may be limited to this subset.

4. Imaging with Primaries and Multiples

Similarly to the MAUDD method discussed above, the imaging method of Muijs et al. (Muijs, R., K. Holliger, and J. Robertsson [2005] *Prestack Depth Migration Of Primary And Surface-Related Multiple Reflections:* 75th Annual International Meeting, SEG, Expanded Abstracts, 2107-2110) requires a downgoing wavefield which includes the incident wavefield. In this application, the image is formed from primaries as well as free-surface multiples.

5. Imaging with Primaries and Source-Side Ghost

Most depth imaging methods assume an isotropic point source for the source wavefield and are formulated for source-side deghosted data. The source wavefield estimate of the invention can be used within existing implementations of seismic migration methods with a source wavefield including the source-side ghost. The present invention may also be used to define a subset of data for which the uncertainty in the estimate of the source wavefield is expected to be low, so that subsequent processing may be limited to this subset.

This may be particularly of interest for WAZ streamer surveys where source side deghosting and multiple attenuation may not be applied (relying on the power of stack to suppress the multiples).

6. AVO and Full-Waveform Inversion

Similarly to depth migrations as discussed above, AVO (amplitude-versus-offset) and full-wavefield inversion methods would benefit from including a source wavefield estimate (and its confidence intervals) in the inversion process. The present invention may be used to provide this estimate, and the invention may also be used to define a subset of data for which the uncertainty in the estimate of the source wavefield is expected to be low, so that subsequent processing may be limited to this subset.

7. Source Deconvolution

The confidence intervals on the estimate of the source wavefield and the methodology described in the previous section could be applied to the processes of directional source deconvolution, thereby allowing the process to be limited to ranges of frequencies and take-off angles for which the uncertainty in the estimate of the source wavefield is expected to be low.

Note that directional deconvolution has similarities with the MAUDD method, and may benefit from an implementation similar to the multi-dimensional MAUDD method.

Directional deconvolution is applied typically in common receiver gathers, and requires dense sampling of traces in that domain. When the sampling is adequate, directional deconvolution may be applied as a pre-processing step, effectively removing source-array effects from the data. Alternatively, when the sampling is too sparse for directional deconvolution, it may be beneficial to deal with the source-directivity effects in later steps of the processing, as described in applications listed above (3, 5 and 6).

8. Acquisition using Simultaneous Sources

Stefani et al. (Stefani, J., G. Hampson, F. Herkenhoff, [2007], *Acquisition Using Simultaneous Sources*: EAGE Int. Annual Conf., Expanded Abstracts, (B006) report on field experiments where energy from two seismic sources operating simultaneously (e.g. with only small delays between shots from each source) is recorded with a seismic array, and then processed in such a way as to simulate the data that would be recorded if each source were operating in isolation. Stefani et al. indicated that the strongest amplitude events (direct arrivals and sea bed reflections) are the most difficult to separate. We propose to remove deterministically a component of the strongest events, using the method for estimation of the incident wavefield disclosed in this invention. The deterministic removal may include the modeling of seabed reflection and refractions, in addition to the incident wavefield. It may also be necessary to improve the removal by applying a matching filter prior to the subtraction of the model from the data. After removal of the incident wavefield and sea-bed related reflections and refractions, the separation of the remaining data continues, for instance using the method of Stefani et al., or any other method that doesn't require the complete wavefield. The present invention may also be used to define a subset of data for which the uncertainty in the estimate of the source wavefield is expected to be low, so that subsequent processing may be limited to this subset.

Figures 4A, 4B:
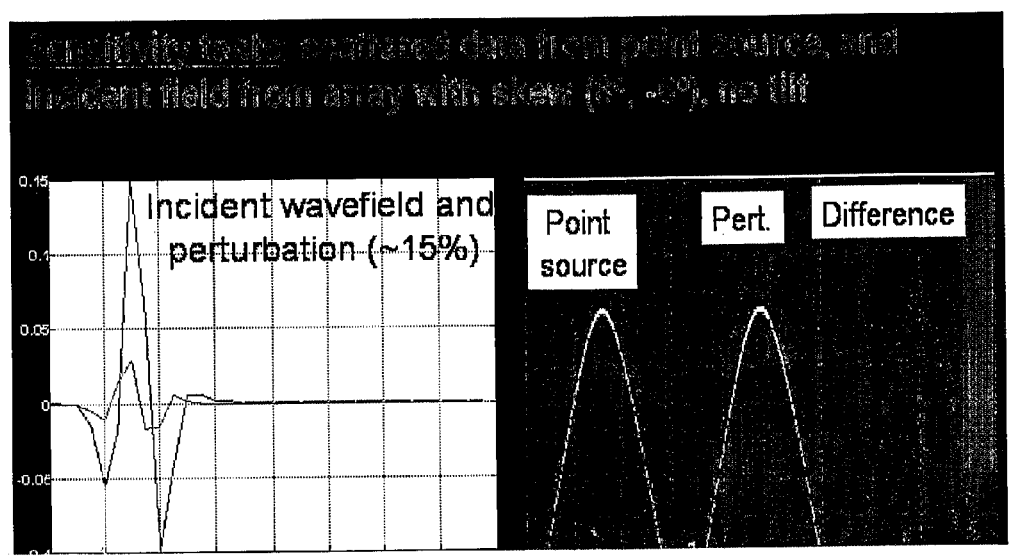
FIGS. 4(*a*) and (*b*) illustrate further results obtained by an embodiment of the invention.

FIGS. 4(*a*) and 4(*b*) illustrate further applications of the invention. Synthetic seismic data are computed for a single layer constant velocity model and a source array of 2 sub-arrays, 6 guns each. The incident wavefield is then replaced with a perturbed wavefield, corresponding to a horizontal rotations (skew angle) of 8 degrees and −6 degrees respectively. The vertical rotation (tilt angle) is zero in this example. The MAUDD process is applied and the difference between in the result due to the error in the incident wavefield is displayed. In this case, the result is stable with respect to the perturbation. A similar procedure can be repeated for a range of perturbations, and help to determine ranges of frequencies and take-off angles for which an estimate of the incident wavefield is suitable for MAUDD applications.

Figure 5:
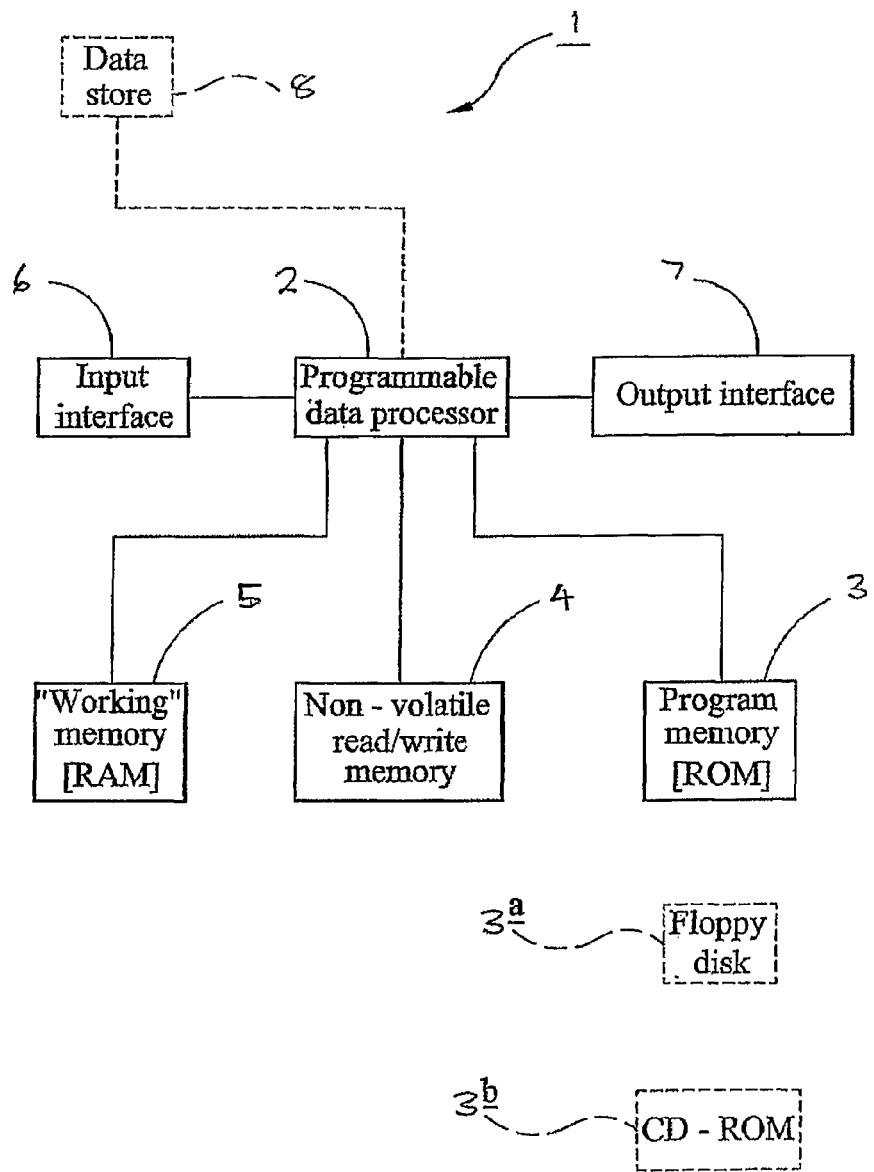
FIG. 5 is a block schematic diagram of an apparatus in accordance with an embodiment of the present invention.

FIG. 5 is a schematic block diagram of a programmable apparatus 1 according to the present invention. The apparatus comprises a programmable data process 2 with a program memory 3, for instance in the form of a read-only memory (ROM), storing a program for controlling the data processor 2 to perform any of the processing methods described above. The apparatus further comprises non-volatile read/write memory 4 for storing, for example, any data which must be retained in the absence of power supply. A "working" or scratch pad memory for the data processor is provided by a random access memory (RAM) 5. An input interface 6 is provided, for instance for receiving commands and data. An output interface 7 is provided, for instance for displaying information relating to the progress and result of the method. Seismic data for processing may be supplied via the input interface 7, or may alternatively be retrieved from a machine-readable data store 8.

The program for operating the system and for performing a method as described hereinbefore is stored in the program memory 3, which may be embodied as a semi-conductor memory, for instance of the well-known ROM type. However, the program may be stored in any other suitable-storage medium, such as magnetic data carrier 3*a*, such as a "floppy disk" or CD-ROM 3*b*.

The invention claimed is:

1. A method of identifying geological structure within the Earth including processing seismic data acquired consequent to actuation of a seismic source array, the method comprising the steps of:
    (a) determining, by a computer processor, the source wavefield of the seismic source array and the uncertainty in the source wavefield by:
        (i) estimating a source wavefield from measurements acquired by at least one near-field measuring receiver and from a first parameter set including at least one parameter indicative of the position or orientation of the seismic source array relative to the at least one measuring receiver;
        (ii) varying the value of at least one parameter of the first parameter set;
        (iii) estimating the source wavefield from the measurements acquired by the at least one measuring receiver and from the varied first parameter set; and
        (iv) obtaining information about the uncertainty in the estimate of the source wavefield from the results of step (i) and (iii); and
    (b) using the determined source wavefield of the seismic source array and the uncertainty in the source wavefield to process the seismic data to obtain information about at least one parameter of the earth's interior, wherein processing the seismic data includes selecting, for processing, a subset of the seismic data in which the expected uncertainty is low by either:
        determining a frequency range in which the effect of uncertainty is low and selecting seismic data within the frequency range for processing; or
        determining a range of take-off angles in which the effect of uncertainty is low and selecting seismic data within the range of take-off angles for processing.

2. A method as claimed in claim 1 and comprising the further steps of:
    (c) (i) estimating the source wavefield from measurements acquired by the at least one near-field measuring receiver and from a second parameter set different from the first parameter set and including at least one parameter indicative of the position or orientation of the seismic source array relative to the at least one measuring receiver;
    (ii) varying the value of at least one parameter of the second parameter set;
    (iii) estimating the source wavefield from the measurements acquired by the at least one measuring receiver and from the varied second parameter set; and
    (iv) obtaining further information about the uncertainty in the estimate of the source wavefield from the results of step (i) and (iii).

3. A method as claimed in claim 1 and comprising applying a constraint when varying the at least one parameter in step (ii).

4. A method as claimed in claim 1 wherein the at least one parameter comprises the position or depth of the seismic source.

5. A method as claimed in claim 1 wherein the at least one parameter comprises the position or depth of the measuring receiver.

6. A method as claimed in claim 1 wherein the at least one parameter comprises the tilt of two or more seismic sources of the source array.

7. A method as claimed in claim 1 wherein the at least one parameter comprises the skew of two or more seismic sources of the source array.

8. A method as claimed in claim 1 wherein the seismic data comprises marine seismic data.

9. A method as claimed in claim 8 wherein one of the first and second parameter sets comprises a parameter indicative of the state of the sea surface.

10. A method as claimed in claim 9 wherein one of the first and second parameter sets comprises the mean wave height.

11. A method as claimed in claim 1 wherein the data acquired by the measuring receiver comprises near-field data.

12. A method as claimed in claim 1 wherein the data acquired by the measuring receiver comprises near-field pressure data.

13. A method as claimed in claim 1 and comprising the step of acquiring the seismic data.

14. A method as claimed in claim 1 and comprising the step of acquiring the data at the measuring receiver.

* * * * *